United States Patent
Iwema et al.

(10) Patent No.: US 7,137,077 B2
(45) Date of Patent: Nov. 14, 2006

(54) FREEFORM ENCOUNTER SELECTION TOOL

(75) Inventors: Marieke Iwema, Seattle, WA (US); Leroy B. Keely, Portola Valley, CA (US); F. David Jones, Redmond, WA (US); Robert J. Jarrett, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 736 days.

(21) Appl. No.: 10/207,134

(22) Filed: Jul. 30, 2002

(65) Prior Publication Data

US 2004/0021701 A1    Feb. 5, 2004

(51) Int. Cl.
*G06F 3/00* (2006.01)
*G06F 3/041* (2006.01)

(52) U.S. Cl. .................................. 715/863; 345/179

(58) Field of Classification Search ................ 345/179; 715/863, 854
See application file for complete search history.

(56) References Cited

U.S. PATENT DOCUMENTS

| | | | | |
|---|---|---|---|---|
| 4,812,832 A * | 3/1989 | Oishi et al. | .................. | 345/160 |
| 5,471,578 A * | 11/1995 | Moran et al. | ................ | 715/863 |
| 5,515,486 A * | 5/1996 | Amro et al. | ................ | 715/848 |
| 5,523,775 A * | 6/1996 | Capps | .......................... | 345/179 |
| 5,548,705 A * | 8/1996 | Moran et al. | ................ | 715/863 |
| 5,592,608 A * | 1/1997 | Weber et al. | ................ | 715/863 |
| 5,666,139 A * | 9/1997 | Thielens et al. | ............. | 345/173 |
| 5,682,439 A * | 10/1997 | Beernink et al. | ............ | 382/187 |
| 5,889,523 A * | 3/1999 | Wilcox et al. | ............... | 715/854 |
| 6,020,895 A * | 2/2000 | Azami | ........................ | 345/619 |
| 6,289,303 B1 * | 9/2001 | Atkin et al. | .................... | 704/8 |
| 6,332,148 B1 * | 12/2001 | Paine et al. | .................. | 715/512 |
| 6,347,290 B1 * | 2/2002 | Bartlett | ........................ | 702/150 |
| 6,459,442 B1 * | 10/2002 | Edwards et al. | ............ | 715/863 |
| 6,525,749 B1 * | 2/2003 | Moran et al. | ............... | 715/863 |
| 6,567,101 B1 * | 5/2003 | Thomas | ...................... | 345/649 |
| 6,671,684 B1 * | 12/2003 | Hull et al. | ..................... | 707/6 |
| 6,683,600 B1 * | 1/2004 | Lui | ............................ | 345/179 |
| 6,687,876 B1 * | 2/2004 | Schilit et al. | ............... | 715/512 |
| 6,788,815 B1 * | 9/2004 | Lui et al. | ..................... | 382/187 |
| 6,938,220 B1 * | 8/2005 | Shigematsu et al. | ........ | 715/863 |
| 6,947,033 B1 * | 9/2005 | Fåhraeus et al. | ............ | 345/175 |
| 7,086,013 B1 * | 8/2006 | Saund et al. | .................. | 715/863 |
| 2002/0008721 A1 * | 1/2002 | Fahraeus et al. | ............ | 345/863 |
| 2004/0119762 A1 * | 6/2004 | Denoue et al. | ............. | 345/863 |

OTHER PUBLICATIONS

Ward, Jean et al. "An annotated bibliography in pen computing and handwriting character recognition" 1992.*
Schilit, Bill et al. "Beyond Paper: Supporting Active Reading with free form digital ink annotations" CHI 98.*

* cited by examiner

*Primary Examiner*—Weilun Lo
*Assistant Examiner*—Steven Theriault
(74) *Attorney, Agent, or Firm*—Banner & Witcoff, Ltd.

(57) ABSTRACT

A freeform selection tool for a computer system with a graphical user interface allows a user to draw a freeform selection path so as to select one or more graphical objects. The user is provided with the freedom to input selection ink, in any orientation, and using any desired selection path size provided by the select tool. The selecting tool may change the visual appearance of any graphical object once selected. The selecting tool provides the ability to select ink or graphical object with a particular property to be used for the selection. The selecting tool can recognize various selection gestures coordinated with a semantic relationship of the ink so that the number of selection ink strokes can be minimized. The selecting tool may change for different selection modes depending on the type of graphical object encountered and change of the context for a particular selection.

32 Claims, 10 Drawing Sheets

FREEFORM ENCOUNTER SELECTION TOOL

FIELD OF THE INVENTION

Aspects of the present invention are directed generally to systems and methods for controlling a graphical user interface (GUI). Specifically, aspects of the present invention relate to providing systems and methods to allow users to select and manipulate electronic or digital ink.

BACKGROUND OF THE INVENTION

Graphical user interfaces have created a revolution in the field of computers. Instead of having to memorize arcane commands, the user can now manipulate software applications by controlling graphical objects representing their various functions and components. Conventional computer systems, especially computer systems using graphical user interface (GUI) systems, accept user input from one or more discrete input devices, such as a keyboard for entering text, and a pointing device, such as a mouse with one or more buttons, for operating the user interface. The keyboard and mouse interface provides for creation and modification of documents, spreadsheets, database fields, drawings, photos and the like. This GUI has proven effective, but a new step in the evolution of computing has revealed several drawbacks to existing GUIs.

Specifically, the introduction of pen-based computing devices has changed the way individuals view the GUI, and the manner in which users interact with their computers. Some pen-based computing devices, include a personal data assistant (PDA) or the Tablet PC. While there are a number of designs, a pen-based computing device is generally interacted by user by way of a physical writable surface and a writing implement. The writable surface may be a display surface or a writing pad. Rather than a standard keyboard or mouse interface, the navigation and control of the GUI occurs via the writing implement. While pen-based computing devices have been helpful, the transition to a computer-based inking arrangement may prove difficult indeed. This new approach to user interfaces has revealed problems and deficiencies in the traditional GUI described above. Examples of these problems will be discussed below.

One common use of computers and GUIs is to generate and edit electronic documents. These electronic documents can contain text (e.g., electronic word processors) and/or images (e.g., pictures), which are displayed on the user's screen for editing. However, in a pen-based computing environment, users may attempt to use text-based techniques for selecting objects. These text-based techniques are restrictive and can be counterintuitive for working in a pen-based computer environment.

The selection in text systems is based on the placement of an insertion point in the document. A mouse input device is used for pointing and selecting objects. For example, the user typically uses the mouse to move an onscreen pointer to the desired characters, and presses a button on the mouse for an insertion point. Then the user drags the pointer over characters to select them. The selection of the particular character may be reflected in a change in its appearance. For example, electronic word processing programs may display in black on a white background. The text may be arranged automatically in uniform rows of text across the user's screen, where the rows of text are assigned a predefined height based on user-defined settings (e.g., the use of 12 pt. font, the line spacing, etc.). Upon selecting these words the selected text may be given a white color, and the rectangular area inhabited by the text in the row may be given a black background that serves as a blocked selection highlight, identifying the selected text. The black blocked selection highlight occupies the entire row height, and serves to differentiate the selected text from the non-selected text.

Although this previous approach to highlighting text works in the restricted uniform, line-by-line environment of traditional word processors, this approach is undesirable in other environments that allow a greater degree of freedom movement and expression, such as pen-based computing devices. For example, in systems where the text is handwritten ink (e.g., on a personal data assistant using a touch-sensitive screen or a Tablet), the user is permitted to write text above, below, and at other angles to any such regimented lines. The lines are often not present on a writing surface. In the freeform environment, the ink is placed on the writing surface in non-uniform patterns and irregular patterns. Users may write and sketch on the same electronic page and/or annotate ink sketches. As a result, the handwritten ink characters and sketches are not in straight lines, even if the guide lines are present. The "blocked" approach discussed above does not allow for efficient selecting irregular non-uniform patterns of handwritten ink, non-ink graphical objects, and/or ink sketches. As a result, the blocked approach in a handwritten environment results in confusion as to what is actually selected, selecting the wrong objects, imprecision and inefficiency for the user.

Notwithstanding the drawbacks of "block selection" techniques of conventional word processing programs and the like, various tools have been developed to assist a user in selecting specific graphical objects for manipulation. For instances, some software applications allow a user to form a "rubber band" rectangle around one or more adjacent graphical objects. With this rubber band rectangle tool, a user activates the selection function, places a cursor at a first location, and then drags the cursor to a second location. As the cursor is being dragged, the tool forms a rectangular selection box with the first location of the cursor and the current location of the cursor as opposite vertices of the selection box. By continuing to drag the cursor, a user can change the dimensions of the selection box to encompass one or more graphical objects. When the user releases the selection function, the graphical objects completely encompassed by the selection box are selected for subsequent manipulation.

While this type of selection tool provides some ability for a user to select individual graphical objects, this tool has several drawbacks. First, the tool forms a single rectangular selection area. In many cases, a user may wish to select multiple graphical objects that cannot be bounded by a single rectangular selection box without that box also encompassing graphical objects that the user does not wish to select. This maybe a particularly significant drawback when the graphical objects are handwritten words is irregular pattern and a user may want to simultaneously select words forming sentences that do not always start or end beginning or end of a line. Additionally, the single rectangular approach goes around an object akin to a surround select approach. This approach can be counterintuitive for working in a pen-based computer environment and may create barriers to adoption of pen-based computing systems.

Second, in order to select a graphical object, the selection box must completely encompass that object. If a user is working quickly, the user may inadvertently form a selection box that does not entirely encompass a desired graphical object, even if the box borders hits the graphical object.

When the user then releases the selection function, the desired object may not always be selected. Some alternate arrangements of this tool require the selection box to encompass only a designated center of a graphical object, but the user may still encircle a large portion of a desired object without actually selecting that object. Third, the nature of handwritten ink can render a rectangular selection tool problematic and ineffective. For example, handwritten ink characters can have ascenders and descenders from individual letters that may overlap on each other when the ink is on a particular page. As a result, the overlapping nature of the handwritten ink can make it difficult to select a particular line of handwriting with a rectangular selection tool. Thus, the use of this tool requires an inconvenient amount of precision from the user and can be inefficient.

In some existing systems, a drag selection approach, akin to holding down a mouse button and dragging to select text in a text editor may select large areas of blank space (i.e., white space) on the page. When this selected text is cut and pasted (using standard computer-based text editing techniques), the large volume of selected blank space may produce an unintended and surprising result. This result is counterintuitive to the average computer user because conventional text editing systems work differently. The unfamiliar operation of a pen-based system compared to known text based systems creates barriers to adoption of pen-based computing systems.

Accordingly, there is a need for a selection tool that will allow a user to conveniently select one or more graphical objects in their entirety, without requiring an inconvenient amount of precision from the user and provide a significant degree of freedom for selection. Further, there is a need for a selection tool that can be flexibly used to select a graphical objects that are not arranged in a straight line for freeform environments, and which indicates to the user when one or more objects actually are selected during the selection process.

SUMMARY

Aspects of the present invention pertain to an encounter select tool, which allows a user to create a freeform path in a graphical environment to as to select one or more graphical objects. Thus, overcoming one or more problems in previous systems.

As the user drags a pen, a freeform selection path is created so that the encounter select tool selects graphical objects that are encountered. In one aspect, a user is enabled to drag a pen to select ink in a freeform graphical environment. In one aspect, an encounter select tool enables a user to draw a freeform line of selection ink so as to select one or more graphical objects, such as ink objects or non-ink objects. The user is provided with the freedom to input selection ink, in any orientation, and using any desired selection ink stroke size provided by the encounter select tool. In another aspect, the encounter select tool may change the visual appearance of any graphical object once selected. In one aspect, the encounter select tool may give a selected ink object in a hollow appearance or halo for visual user feedback.

In one aspect, the encounter select tool allows a user to select ink having a particular property. In this way, the encounter select tool may enable the user to only select the ink with a particular property, while leaving the remainder of the ink intact, e.g. non-selected. In one case, the encounter select tool provides the ability to select the color of ink or graphical object to be used for the selection. In another aspect, the encounter select tool can recognize various selection gestures coordinated with a semantic relationship of the ink so that the number of selection ink strokes can be minimized. In further aspects, the encounter select tool may change for different selection modes depending on the type of graphical object encountered and change of the context for a particular selection. In a further aspect, the encounter select tool enables discontinuous selections of graphical objects using a selection path and/or selected ink. Thus, the user is provided with an intuitive encountering select tool for dragging a pen to an object to select a graphical object.

The above and other aspects, features and advantages of the present invention will be readily apparent and fully understood from the following detailed description in conjunction with the accompanying drawings, which are included by way of example, and not by way of limitation with regard to the claimed invention.

DETAILED DESCRIPTION

Figure 1:
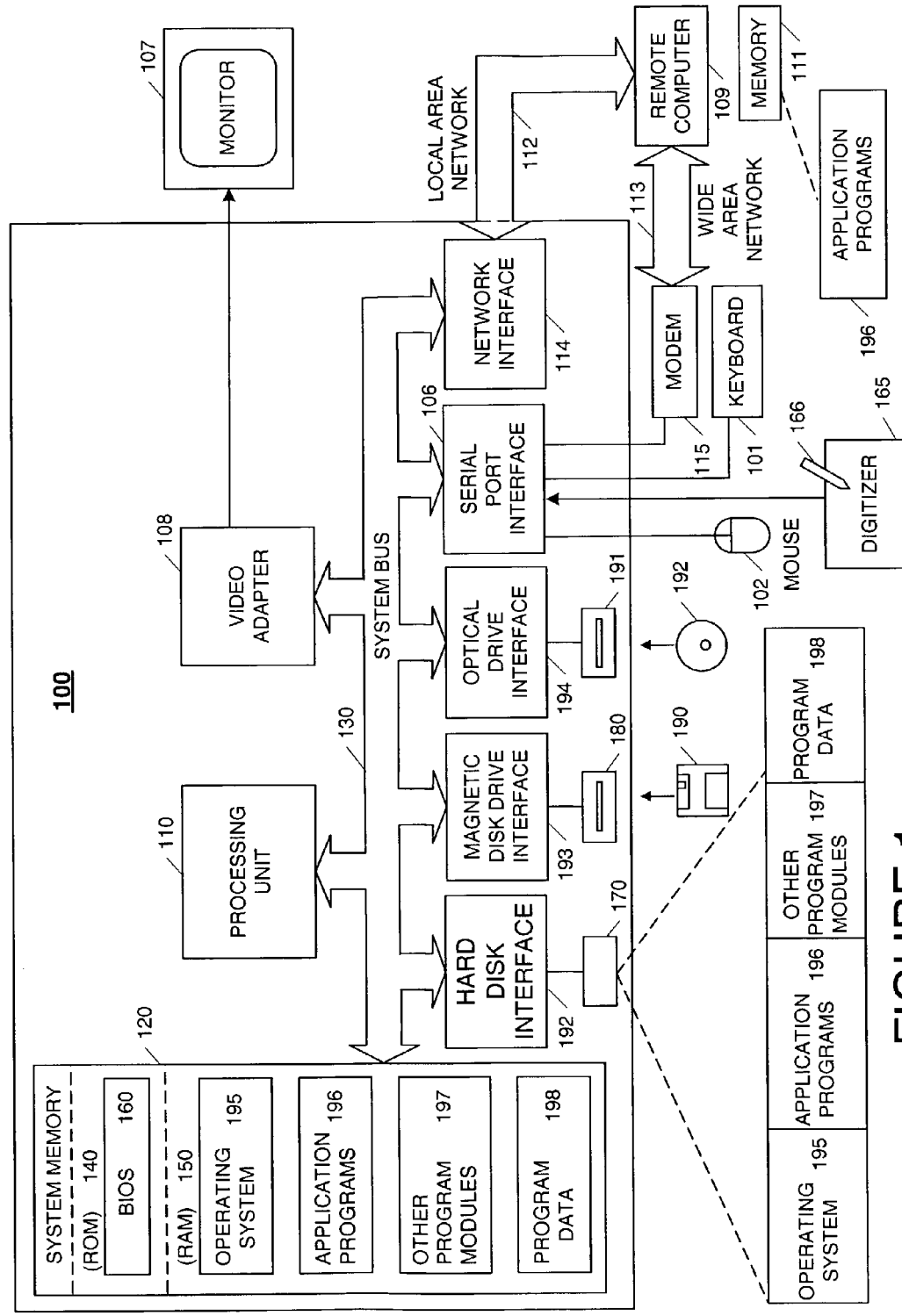
FIG. 1 is a functional block diagram of a general-purpose digital computing environment in which aspects of the present invention may be implemented.

The following description is divided into sub-sections to assist the reader. The sub-sections include: Terms, Overview, Illustrative Operating Environment, Use of the Encounter Select Tool, The Encounter Select Tool, and Summarization.

Terms

As used herein the term "stroke" refers to a sequence or set of captured points. For example, when rendered, the sequence of points may be connected with lines. Alternatively, a stroke may be represented as a point and a vector in the direction of the next point. In short, a stroke is intended to encompass any representation of points or segments relating to ink, irrespective of the underlying representation of points and/or what connects the points.

As used herein the term "ink" refers to a sequence or a set of handwritten strokes. The strokes may be for characters and/or sketches. The strokes may be combined with one or more properties.

As used herein the term "selection ink" refers ink that is intended for choosing a particular graphical object for manipulation. For example, the selection ink may be combined with one or more properties and may be presented visually or not shown. The selection ink can be invisible, but a selection path may include the selection ink.

As used herein the term "point" refers to information defining a location in predefined space. For example, a point may be defined relative to a capturing space (for example, points on a digitizer) and/or a display space (the points or pixels of a display device). Points may be represented using a variety of known techniques including two dimensional Cartesian coordinates (X, Y), polar coordinates, three dimensional coordinates, and other techniques as known in the art.

As used herein the term "ink word" refers to one or more handwritten strokes. Each stroke in an ink word has a location associated with the stroke.

As used herein the terms "text word" or "text" refers to machine-generated text. Text words may be introduced into the systems of the invention in any suitable manner, such as by an input device (e.g., a keyboard), by downloading (e.g., from memory or a network connection), by selecting from a menu, or from input ink words converted to machine-generated text via handwriting recognition software.

As used herein the term "gesture" refers to a movement of a stylus or pen that is for commanding or controlling the functionality of a software program or a computer as opposed to applying ink for characters.

Overview

Examples of the present invention relate to systems and methods for selecting and manipulating electronic or digital ink. In several aspects, a user is provided with "drag to select" features for ink. In one aspect, the encounter select tool of the present invention allows a user to drag a tip of a stylus to form a freeform line of selection ink in order to select one or more graphical objects for manipulation or other operation. As the user draws this freeform selection line, the encounter select tool selects graphical objects that are "touched" by the selection ink. This selection ink thus graphically demonstrates to the user the graphical objects for selection. Therefore, the encounter select tool does not have the limitations of a box or rectangle which are bound to lines in text-based systems. The user is provided with the freedom to select graphical objects in any orientation, and using any desired selection ink stroke size provided by the encounter select tool. Thus, the encounter select tool of the present invention provides a convenient intuitive selection tool for irregularly shaped objects, such as ink objects. Further, the tool conveniently allows for the selection of irregularly or dispersed positioned objects, such as objects that are not arranged in a straight line. Thus, there is no need for an insertion point as in text systems.

In another aspect, the encounter select tool may change the visual appearance of any graphical object once selected. For example, the encounter select tool may give a selected ink object a hollow appearance or halo appearance for visual user feedback. In a further aspect, the encounter select tool may provide the ability to select the color of ink to be used for the selection. For example, a user may have written ink in different colors, such a red color for editing or annotation in ink of a document. In this example, the encounter select tool enables the user to only select the red color ink, while leaving the remainder of the ink intact. In another aspect, the encounter select tool can recognize various selection gestures coordinated with a semantic relationship of the ink so that the number of selection ink strokes can be minimized. In further aspects, the encounter select tool may change for different selection modes depending on the type of graphical object encountered and change of the context for a particular selection.

Illustrative Operating Environment

Aspects of the encounter select tool of the present invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments. As noted above, the present invention relates to the selection of graphical objects displayed by a computer system. Accordingly, it may be helpful for a better understanding of the invention to briefly discuss the components and operation of a general purpose computing environment on which various embodiments of the present invention may be implemented. Such an exemplary computer system is illustrated in FIG. 1.

Accordingly, FIG. 1 illustrates a schematic diagram of an illustrative general-purpose digital computing environment that may be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 101 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108.

In addition to the monitor 107, personal computers typically include other peripheral output devices (not shown), such as speakers and printers. As one example, a pen digitizer 165 and accompanying pen or user input device 166 are provided in order to digitally capture freehand input. The pen digitizer 165 may be coupled to the processing unit 110 via the serial port interface 106 and the system bus 130, as shown in FIG. 1, or through any other suitable connection. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Figure 2:
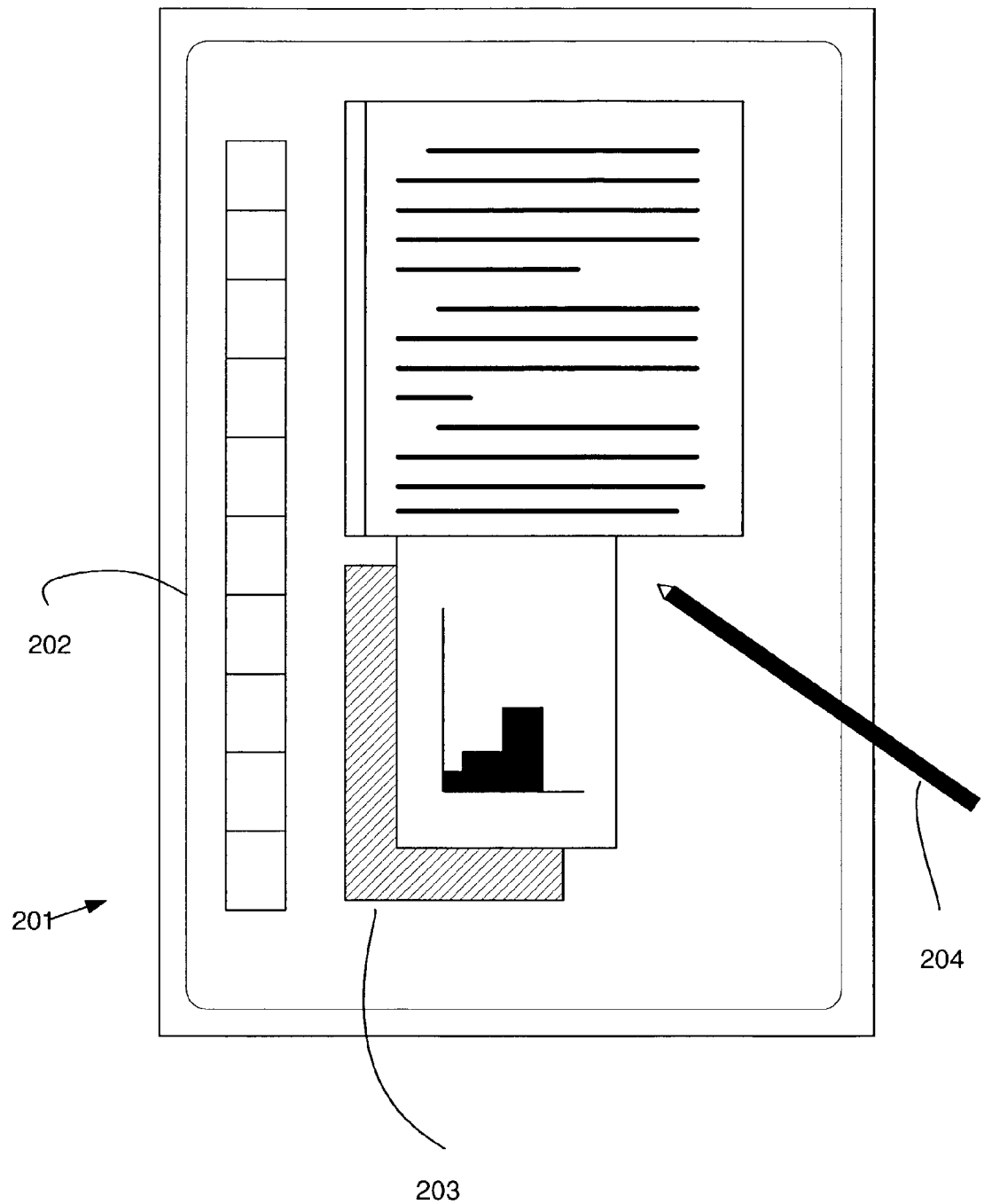
FIG. 2 is a schematic diagram of a pen-based personal computing (PC) environment in which aspects of the present invention may be implemented.

FIG. 2 illustrates an illustrative pen-based computing system 201 that may be used in accordance with various aspects of the present invention. Any or all of the features, subsystems, and functions in the system of FIG. 1 may be included in the computer of FIG. 2. Pen-based computing system 201 includes a display surface 202, e.g., a digitizing flat panel display, such as a liquid crystal display (LCD) screen, on which a plurality of windows 203 is displayed. Using stylus 204, a user may select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Pen-based computing system 201 interprets gestures made using stylus 204 in order to manipulate data, enter text, create drawings, and/or execute conventional computer application tasks, such as spreadsheets, word processing programs, and the like.

The stylus 204 may be equipped with one or more buttons or other features to augment its selection capabilities. In one example, the stylus 204 may be implemented as a "pencil" or "pen," in which one end constitutes a writing element and the other end constitutes an "eraser" end, and which, when moved across the display, indicates portions of the display to be erased. Other types of input devices, such as a mouse, trackball, or the like may be used. Additionally, a user's own finger may be the stylus 204 and used for selecting or indicating portions of the displayed image on a touch-sensitive or proximity-sensitive display. Consequently, the term "user input device," as used herein, is intended to have a broad definition and encompasses many variations on well-known input devices, such as the stylus 204.

Use of the Encounter Select Tool

Figure 3:
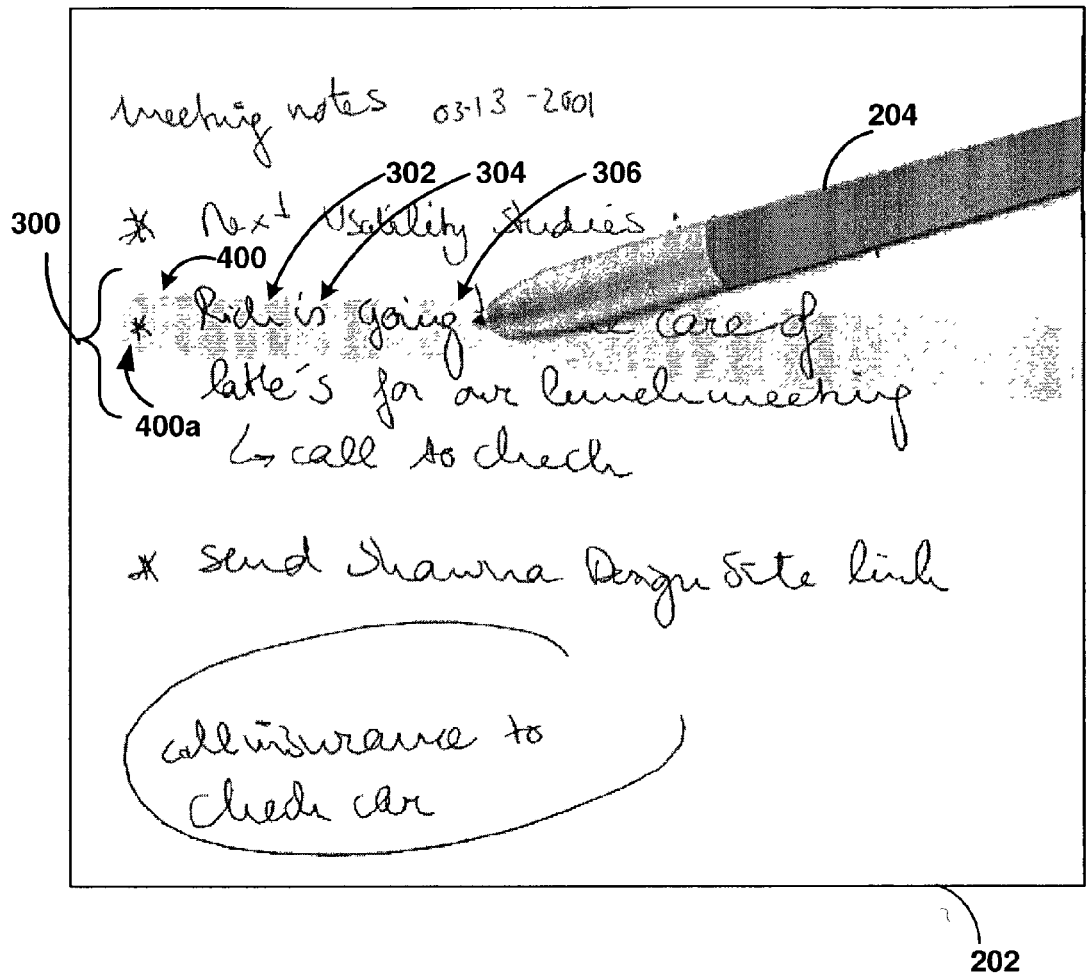
FIG. 3 is a schematic diagram of an example encounter select tool in aspects of the present invention.
Figure 4:
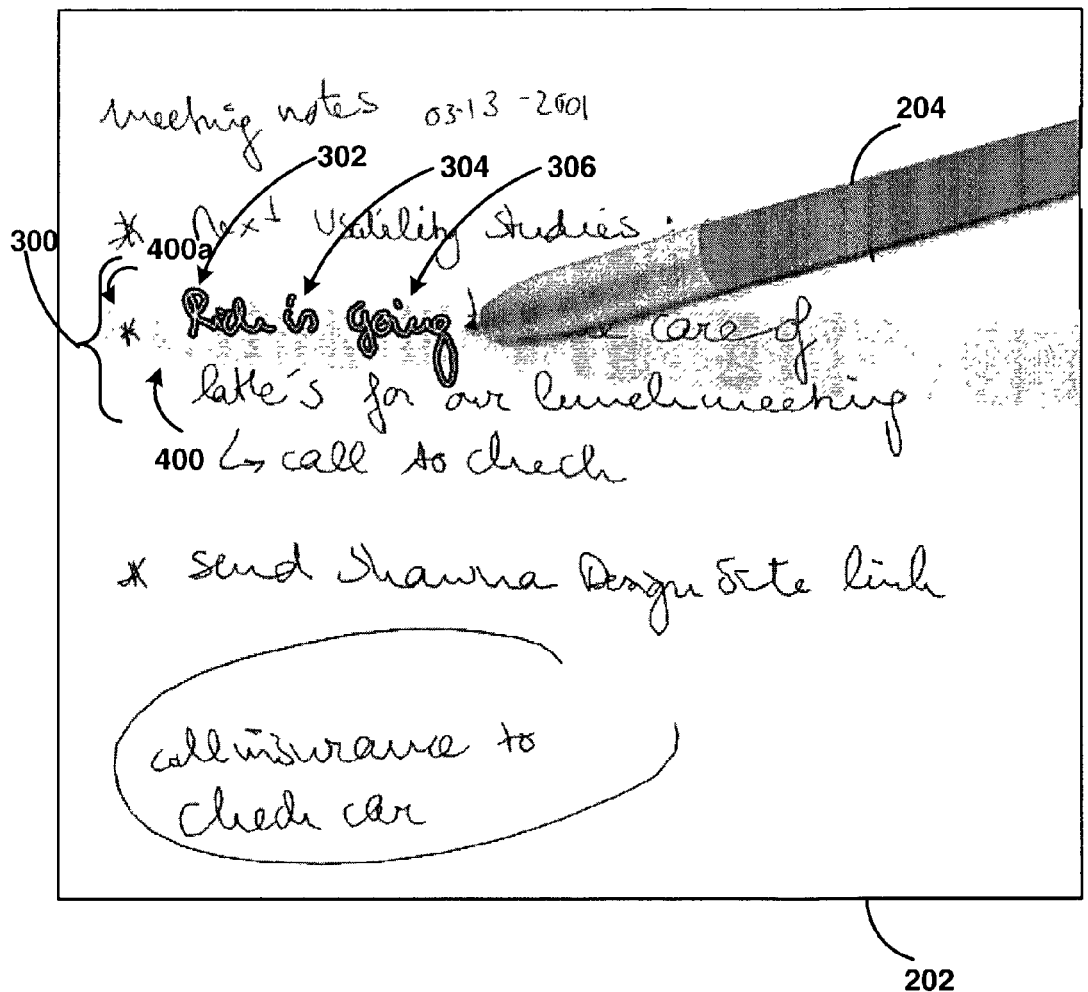
FIG. 4 is a schematic diagram of an example of selected graphical objects with an encounter select tool according to aspects of the present invention.

FIGS. 3 and 4 illustrate an example use of the encounter select tool. More particularly, these figures illustrate the use of the encounter select tool to select freeform handwritten ink notes 300 in a two-dimensional space of a user interface rendered on display surface 202 of pen-based computer system 201. The notes 300 are made up of ink word graphical objects, such as the word object 302 ("Rich"), the word object 304 ("is"), and the word object 306 ("going"). It will be appreciated that ink word graphical objects 302, 304 and 306 are made from strokes of ink on a pen down action, which may be stylus 204 contacting the display surface 202, the click of a stylus or mouse button, the operation of a button on a trackball or joystick, or the like. The user controls an input device (such as stylus 204) and the resulting ink strokes may continue until a pen-up action. The pen up action may be the lifting of the stylus 204 off the display surface 204, releasing or another operation of a stylus or mouse button, or the operation of the button (or other buttons) on the trackball or joystick or the like. Nevertheless, anything appearing on a graphical user interface may be considered to be a graphical object which can be used by the encounter select tool, e.g., ink and non-ink. Other types of graphical objects include but are not limited to graphical icons, images, symbols, and text. Graphical objects may be drawn, or rendered, using any color or pattern value (e.g., hatched, shaded, a series of colors, etc.), and may be drawn on a background of a different color or pattern. In the FIG. 3 example, the background is a simple solid white background, but any other color and/or pattern may be used as the background. The background may also be comprised of one or more other graphical objects.

With continued reference to FIG. 3, to begin a selection operation, the user chooses the encounter select tool or encounter select mode from a menu of one or more available tools or modes. Nevertheless, the tool or mode may be invoked by button in hardware, software, or on the stylus 204. Further, the tool or mode may be started by a predetermined gesture of the stylus 204 operative on a display or in the air. The user then contacts a stylus 204 to a desired location on the display surface 202, e.g. a pen-down action for selection ink. Contacting the stylus 204 with the digitizing display 202 creates the starting point 400*a* of selection ink path 400. To draw the selection ink path 400, the user continues to hold the stylus 204 against the digitizing display 202 while dragging the point of the stylus 204 across the display 202 towards or over the desired selection. Accordingly, selection ink is laid down so as to touch the ink word graphical objects, such as the word object 302 ("Rich"), the word object 304 ("is"), and the word object 306 ("going"). In this manner, any graphical objects in the path 400 will be selected. It will be appreciated that the user is provided with the freedom to input selection ink, in any orientation, and using any desired selection ink stroke size provided by the encounter select tool. While selection ink is shown, the user may alternatively "tap" the desired ink word objects with the tip of the stylus 204 to make a selection.

As seen in FIG. 3, the selection ink path 400 does not fully encompass ink word 302 ("Rich") in that a portion of the "R" is outside of the selection ink 400 thickness or vertical bounds. Likewise, ink word 306 ("going") is also not fully enclosed in that the last "g" is somewhat outside the vertical bounds of the selection ink path 400. While the selection ink path is not completely enclosing the ink words 302 and 306, the user has intended to select these ink words 302 and 306. Accordingly, in both cases, ink word 302 and ink word 306 are selected by being encountered by the selection path ink 400. Advantageously, the encounter select tool provides the user with enhanced selection control. In this manner, high precision required in the selection of graphical objects in past systems is reduced or eliminated.

With various aspects of the encounter select tool of the present invention, the tool may change the appearance of a graphical object in the two-dimensional space rendered by the display surface 202 when that object is selected. Turning to FIG. 4, it can be seen that, the electronic ink in the word object 302 ("Rich"), the word object 304 ("is"), and the word object 306 ("going") is displayed with a hollow appearance or halo appearance when those objects have been selected. There are several advantages to a change in appearance of the word objects. For example, the change of appearance conveniently provides feedback to the user to reliably determine whether an object (or objects) has been selected. The change in appearance may occur in real time as the selection ink is being laid down by the stylus 204. Alternatively, after the selection ink is applied, the user may lift the stylus 204 from the display surface 204 so that a change in appearance on the objects may occur on a pen up action from the selection ink. With other aspects of the present invention, the selection ink path 400 may disappear, but the selected objects will continue to be displayed in a visually distinctive manner (for example, with a hollow effect) to indicate its selection. Still further, the selection ink path 400 may not be displayed, the change in appearance of the objects may occur. Of course, still other aspects of the invention may maintain the appearance of the selection ink. In one aspect, the color of the selection ink may change to the color value of the last encountered ink word for selection feedback. While the illustrated aspects of the present invention provides selected ink objects a hollow appearance, it will be appreciate that other suitable techniques may be used to indicate when an object has been selected with the selection ink, including bolding, coloring, highlighting, underlining or blinking.

Figure 5:
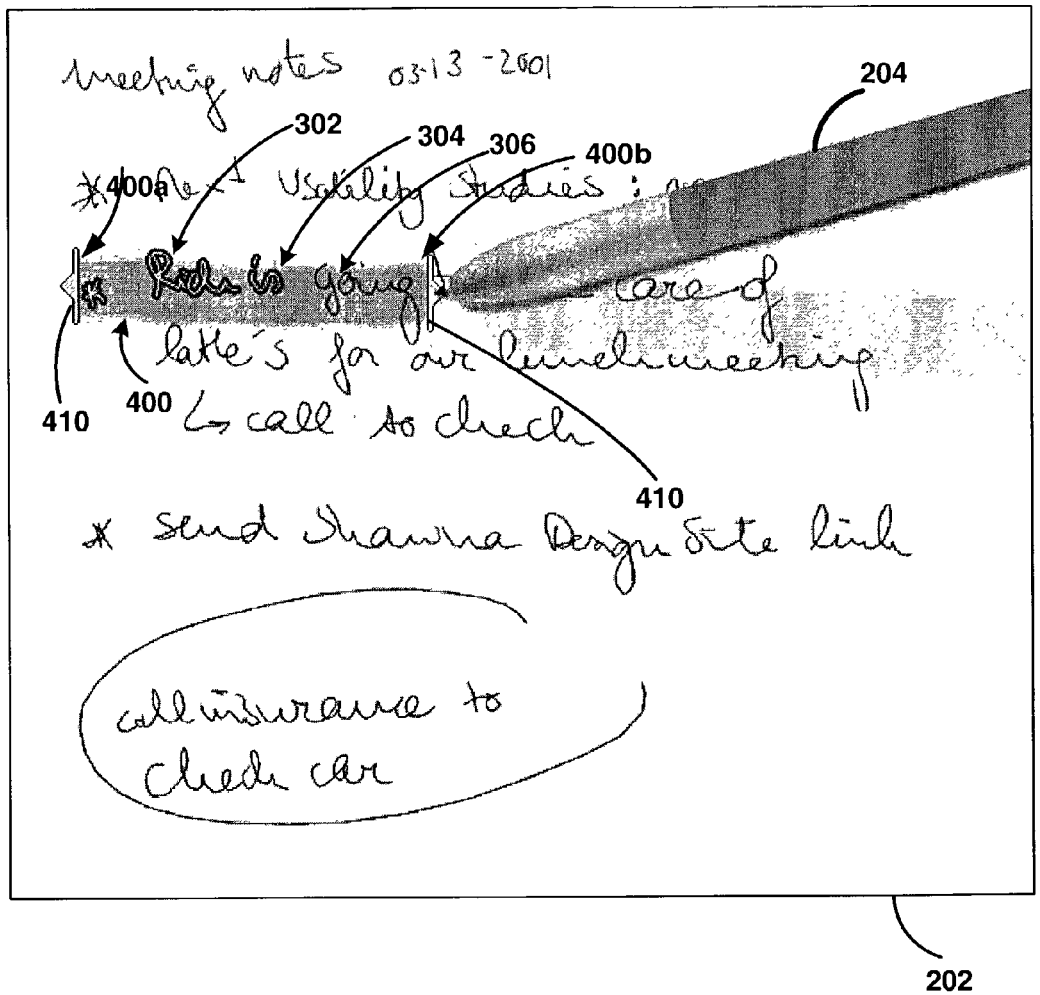
FIG. 5 is a schematic diagram of an example of selected graphical objects with an encounter select tool according to aspects of the present invention.

FIG. 5 illustrates yet another use of the encounter select tool according to aspects of the invention. In a further aspect, graphical handles 410 may be used to indicate the vertical bounds of the selection ink path 400 and the starting point 400*a* and ending point 400*b* of the selection ink path 400. There are several advantages to the use of graphical handles 410. For example, the handles 410 may indicate that the encounter selection tool is active as opposed to just a highlighting ink, which may merely be present on a page. This feature can thus avoid confusion between different modes of using the stylus 204 and provides positive feedback to the user. As noted above, the ink words intersected by the selection ink path 400 or otherwise encountered by the encounter select tool may change visual appearance. As seen in FIG. 5, ink word 302 ("Rich") and ink word 304 ("is") have a different appearance than the selection ink 400 and the other unselected ink words.

While the selection ink path 400 shown in FIGS. 3–5 have been shown as drawn with a stylus 204 on digitizing display 202, those of ordinary skill in the art will appreciate that other techniques can be used to employ the encounter select tool as embodied in the various aspects of the invention. For example, another pointing device, such as a mouse, touchpad, or pointing stick, can be used to draw the path of the selection ink 400 in the two-dimensional space containing the desired graphical objects to be selected. Further, with the use of alternate pointing devices, a non-digitizing display may be used to render the two-dimensional space containing the selection line and the graphical objects to be selected.

The Encounter Select Tool

Figure 6:
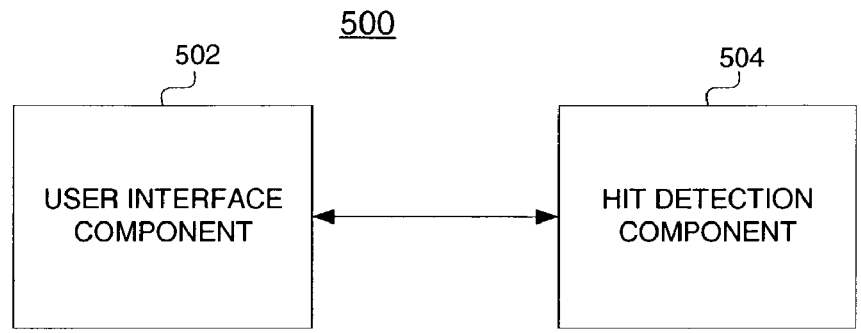
FIG. 6 is a schematic diagram of an encounter select tool according to aspects of the present invention.
Figure 7:
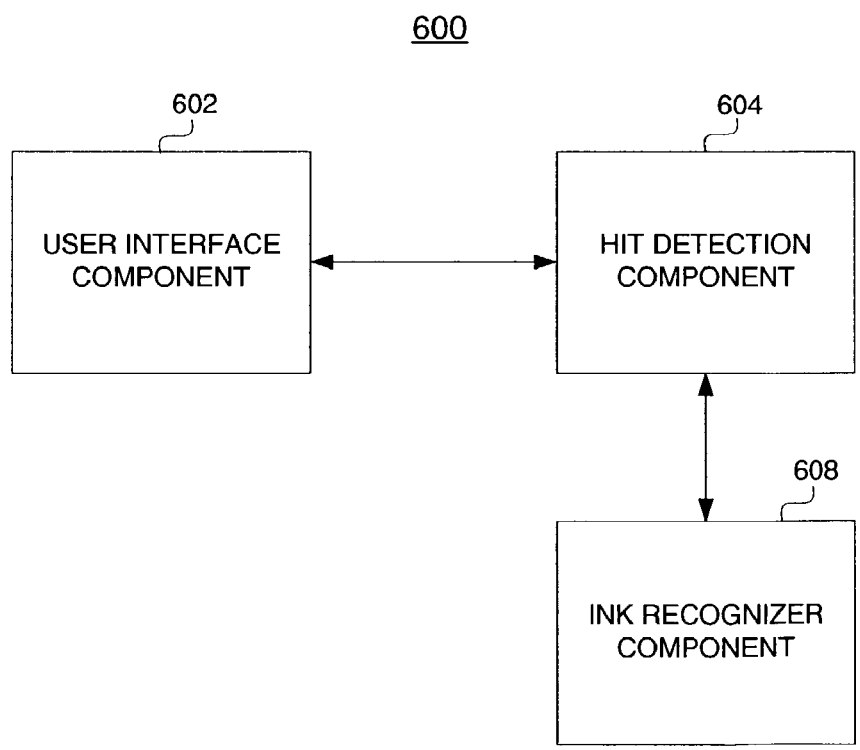
FIG. 7 is a schematic diagram of an encounter select tool according to aspects of the present invention.
Figure 9:
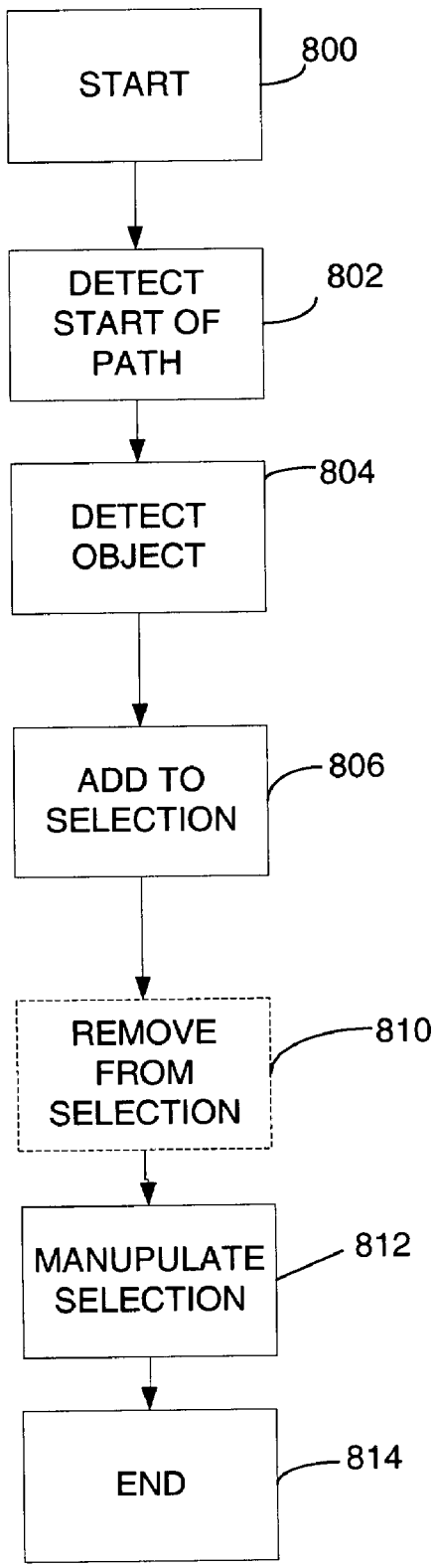
FIG. 9 is a flowchart describing the operation of the encounter select tools shown in FIGS. 6–8.

FIG. 6 illustrates the components of an encounter select tool 500 according to one or more aspects of the invention. As previously noted, the encounter select tools of the present invention may be described in the context of computer-executable instructions, such as program modules/components, executed by one or more computers or other devices. Accordingly, the encounter select tool 500 includes a user interface component 502, and a hit detection component 504. The function of each of these components will be described with reference to FIGS. 6 and 9, which illustrate the operation of the encounter selection tool 500. As seen in FIG. 9, the user starts the operation of the encounter select tool 500 in step 800. The user may, for example, choose the encounter select tool 500 from a list of various tools and functions.

As will be appreciated, the user interface component 502 provides a user interface in a two-dimensional space rendered by a display. This two-dimensional space contains the graphical objects that can be selected by the encounter select tool 500, and may be, for example, a workspace containing the user interface of another software application, such as Microsoft WORD®. The user interface component 502 allows a user to both write selection ink and view the results of the selection process in the two-dimensional space. Accordingly, in step 802, the user interface component 502 may collect selection ink drawn by a user to form the selection ink path 400 (see FIGS. 3–5) and provides hit detection component 504 with the selection ink. Based upon the collected selection ink, the user interface component 502 displays the selection ink path 400 drawn with the selection ink in the two-dimensional space.

The hit detection component 504 receives the selection ink collected by the user interface component 502, and, in step 804, determines whether a graphical object, such as an ink stroke has been encountered by the selection ink. Hit detection component 504 may include various techniques for detecting a stroke of ink. As previously noted, each stroke comprises ink with a set of captured points. In two-dimensional space, x-y Cartesian coordinates of the strokes may intersect the points of the selection ink for one to one correspondence of the points. Alternatively, the hit detection component 504 may have a preset tolerance value coordinated with a distance from the selection ink. This tolerance value may be a few or more pixels to reduce high precision of selection of the strokes.

In one aspect, the hit detection component 504 may be configured to "hit" only ink strokes having a particular ink property, such as a particular color on the display surface 202. In one aspect, a first ink word object can have a first color value and a second ink word object can have a second color value, that is different from the first color value. The encounter select tool 500 with hit detection component 504 may only select first ink word object with the first color value regardless whether the second ink word object is in the selection ink path. For example, a user may have written ink in different colors, such as a red color for editing or annotation in ink of a document composed in ink or a document of text and ink. The user would move the stylus 204 across the desired area. The encounter select tool 500 enables the user to only select the red color ink, while leaving the remainder of the ink or text intact. Since the ink may have preset color values, the selectable color property of the encounter selection tool 500 may be accomplished with hit detection component 504 programmed to recognize a particular color value of the ink. It be will appreciated that objects will generally be determined to have intersected the selection ink path or almost within a tolerance value, then the color value of the object will be compared to the predetermined color value for the encounter selection tool 500. Nevertheless, the encounter select tool may be configured to select ink strokes that has a particular property, in which the color value is just one example of an implementation. The other properties may include thickness of strokes, bold, italics, ink created by a particular user, and the like.

In step 806, the encountered objects may be added to the selection as the selection ink is laid down or after a pen-up action of the stylus. The user interface component 502 can then change the appearance of the objects to provide a visual feedback indicating a selection of the objects by the encounter select tool 500. On the hand, once an object has been selected, a user can also remove the object from the selection or dismiss/clear the entire selection of objects. For example, in step 810, the user can double back or shorten the selection ink path 400 (see FIG. 3) to exclude the desired object from the selection ink path 400. Alternatively, the entire selection of objects may be dismissed by a pen-up action and downwardly tapping the tip of the stylus 204 in any of the display surface not composed of ink, e.g. a white space. It will be appreciated that encounter select tool 500 may select non-ink object as well. For example, dragging the stylus 204 through an image object with selection ink can cause it to be selected by the tool 500. Alternatively, the image object could be selected with a tap of the stylus on the display surface 202.

In step 812, once the graphical objects have been selected with the encounter select tool 500, the user can manipulate the objects for any desired operation. For example, the objects can be move to another location on the display surface, deleted, cut and pasted between applications, operations, and the like. In step 814, the encounter select tool 500 or encounter select mode is deactivated by the user.

FIG. 6 illustrates the components of an encounter select tool 600 according to one aspect of the invention. The encounter select tool 600 may include a user interface component 602, a hit detection component 604, and ink recognizer component 608. User interface component 602 includes the same functions has user interface component 502. Hit detection component 604 includes the same functions as hit detection component 504 and includes other functions according to the present invention. Ink recognizer component 608 receives the ink strokes and classifies the ink strokes for classification into a hierarchical structure reflecting a semantic relationship of the ink. For example, this semantic relationship of ink strokes within ink environment can be determined at an ink stroke level, an ink word level, an ink line level, or an ink paragraph level.

Once the ink strokes are collected, user interface component 602 may send the ink to hit detection component 604. Ink recognizer component 608 recognizes ink strokes made by a user or other method. In one case, the various semantics of the ink relationship can be determined prior to a selection ink path being applied to the display. Hit detection component 604 is configurable via software control to receive the appropriate data for an ink classification mode. In other words, the hit detection component 602 may encounter the handwritten ink via an ink word level, an ink line level, or an ink paragraph level, rather than just the ink stroke level. For example, if a selection path ink contacts any part of an ink word, then the entire ink word can be selected. The benefits of this type of hit detection are more apparent as implemented for ink paragraphs. In one case, if a diagonal selection ink path is applied though the corners of the ink paragraph, the entire paragraph becomes hit or selected. Alternatively, if a vertical selection ink path is applied through an ink paragraph, the entire paragraph may be selected. As can be appreciated this type of functionality has significant advantages. First, there is a time savings and improved user efficiency, because a small quantity of selection ink strokes are used. It is possible to only have a single selection ink stroke to select an ink paragraph. Accordingly, the user can quickly apply the selection ink path over the desired ink word or ink paragraph. Second, there is improved usability and flexibility of pen-based computing system 201, because of the intuitive nature of using selection ink strokes to approximate a pen and paper experience. Nevertheless, after detection of the ink words, ink paragraphs, or ink lines, the hit detection component can inform user selection component 702 of the selection and change the appearance, accordingly.

Figure 8:
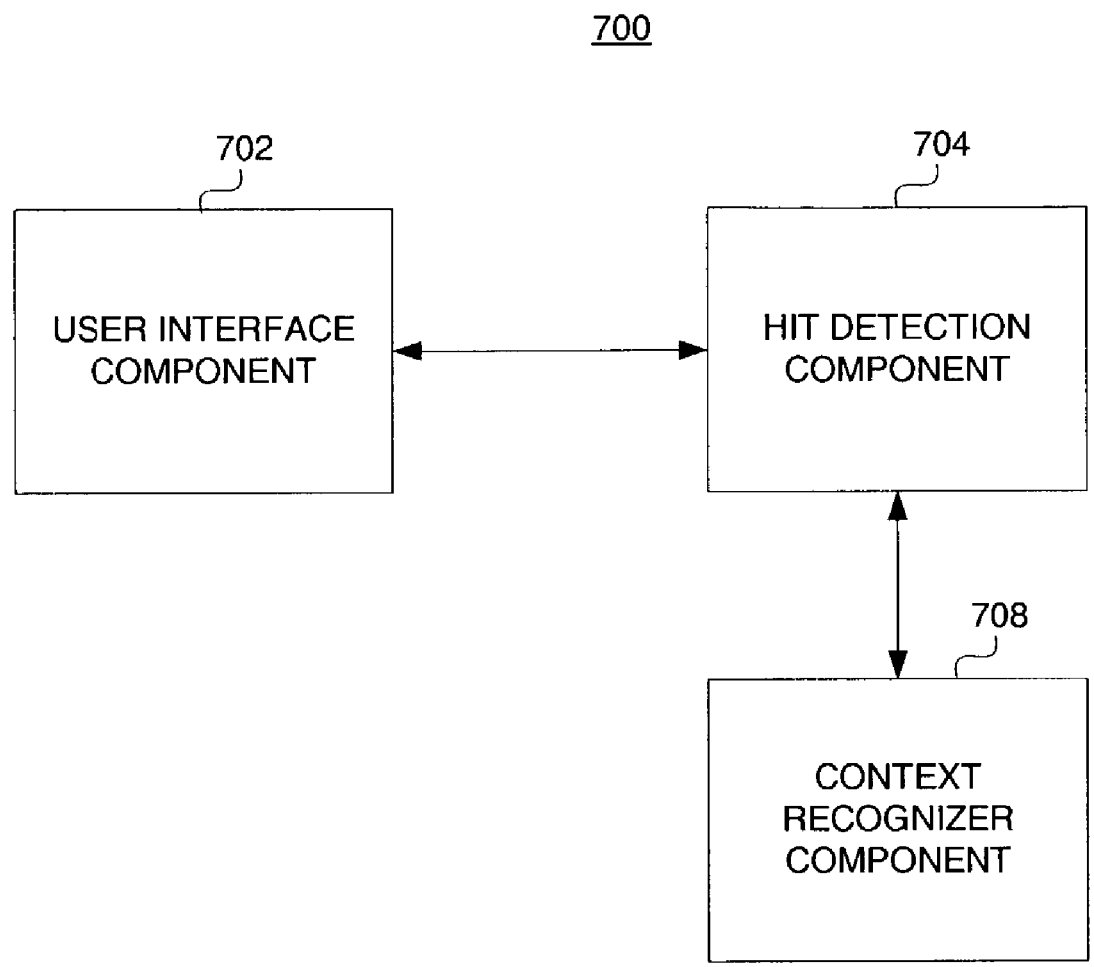
FIG. 8 is a schematic diagram of an encounter select tool according to aspects of the present invention.

FIG. 8 illustrates the components of an encounter select tool 700 according to one aspect of the invention. The encounter select tool 700 may include a user interface component 702, a hit detection component 704, and a context recognizer component 708. User interface component 702 includes the same functions as user interface component 702. Hit detection component 704 includes the same functions as hit detection component 504 and includes other functions according to the present invention. Context recognizer component 708 enables the encounter select tool 700 to recognize the different ink and non-ink objects in a display surface 202 (see FIGS. 3–5).

Once the selection ink strokes are collected, user interface component 702 sends the selection ink to hit detection component 704. Context recognizer component 708 recognizes the previous ink strokes and non-ink data. For example, a display surface 202 may include graphical objects in ink, images, or text. Context recognizer 708 by scanning the display surface may classify the each type of graphical object. For the encounter select tool 700, hit detection component 702 may be configurable via software control to receive the appropriate data for a context mode. In such a case, the hit detection component 704 can encounter the handwritten ink, the images and text and then a graphical change may occur to the selection tool. For example, if text is encountered, the selection tool may transform into a familiar text cursor for line by line selection for text editing. This type of transformation based on the context of the graphical object may be beneficial for user transitioning to a pen-based computing environment. The user may be familiar with a text cursor for a text editor and want to use this type of selection until they are ready for a different selection approach.

Figure 10:
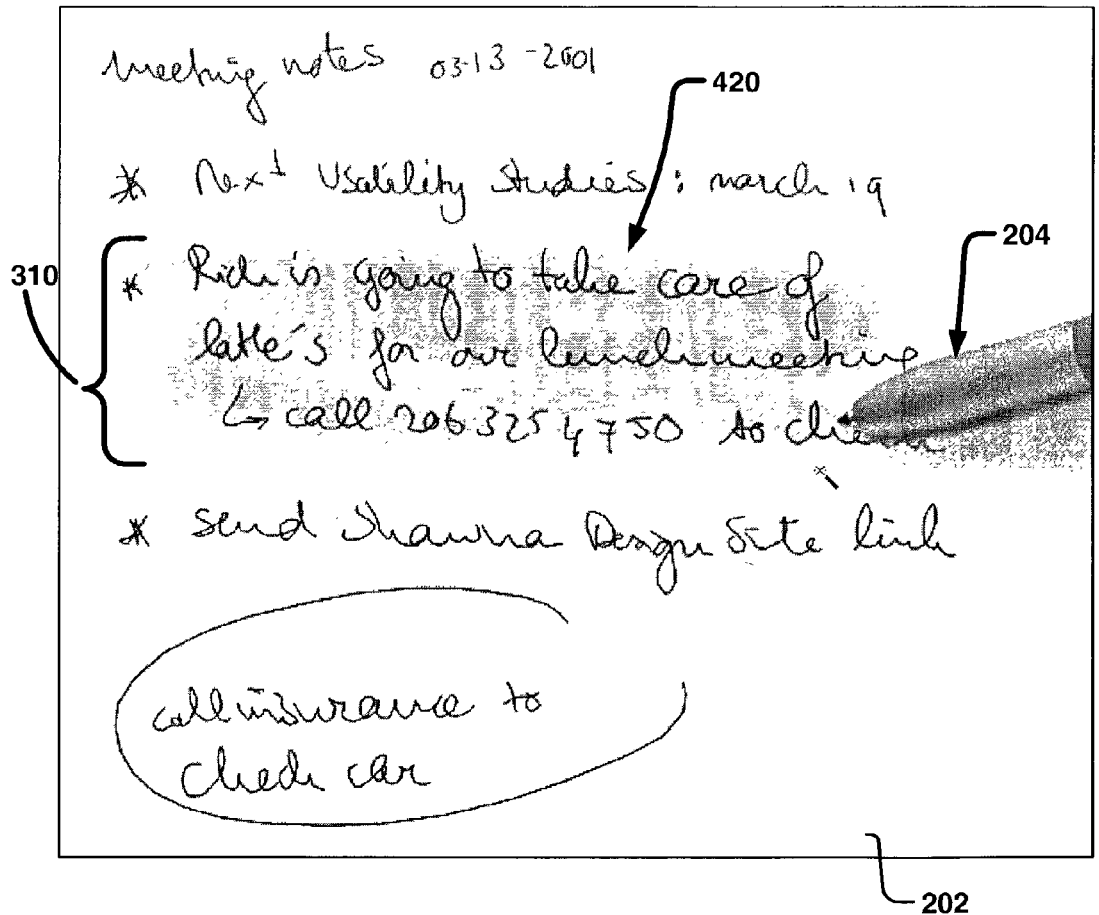
FIG. 10 is a schematic diagram of an example of selected graphical object with a single selection stroke of an encounter select tool according to aspects of the present invention.

In the various aspects of the present invention, encounter select tool 500, 600, 700 with hit detection component 502, 602, 702, respectively, enables multiple graphical objects to be selected by being hit or contacted by the selection ink on the display surface 202. As illustrated in FIG. 10, the encounter select tool 500, 600 and 700 is used to select freeform handwritten ink notes 310 in a two-dimensional space of a user interface rendered on display surface 202 of pen-based computing system 201. Purely way be of example, the notes 310 are made up of ink word graphical objects which comprise "Rich is going to take care of latte for our lunch meeting. Call to check." A single continuous selection ink path 420 is drawn or dragged in a freeform irregular curving pattern (meandering) which encounters the desired ink word graphical objects of the notes 310. In this manner, as long as the selection mode is active, the ink word objects will be selected for later manipulation or other operation.

Figure 11:
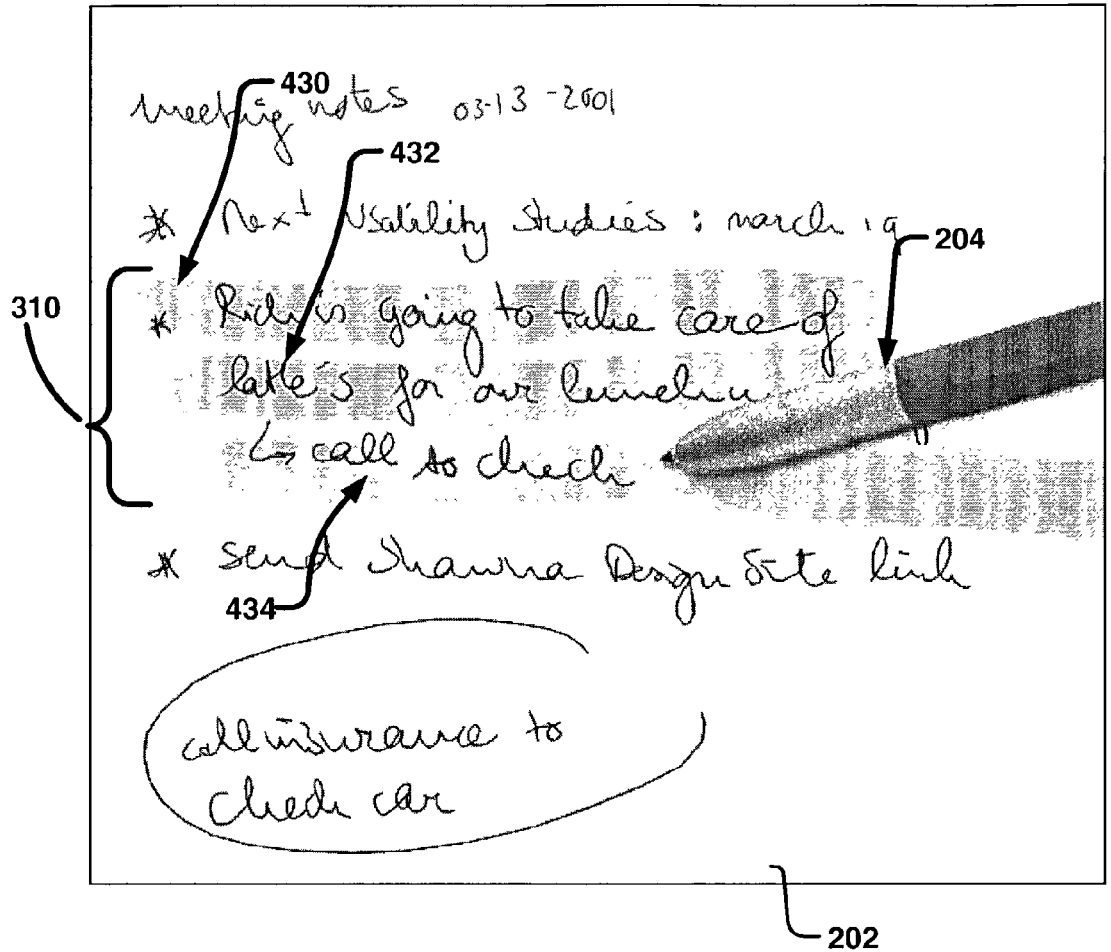
FIG. 11 is a schematic diagram of an example of selected graphical objects with multiple selection strokes of an encounter select tool in a union select mode according to aspects of the present invention.

Alternatively, as shown in FIG. 11, the encounter selection tool 500, 600, and 700 may provide for a union select mode. The union select enables a user to selection additional graphical objects for different selection paths, e.g. paths having a start and end or a tap on a graphical object. For example, to select multiple ink word objects at diverse locations on the display surface 202, a user can drag separate selection ink strokes through the objects. To begin a union selection operation, the encounter select tool 500, 600, 700 is placed in union select mode. The union select mode can be invoked in a number of ways. For example, a gesture of the stylus 204 of pen-based computing system 201 can be used. FIG. 11 shows three selection ink paths unconnected from each other that were created during the union select mode—a first selection ink stroke 430, a second selection ink stroke 432, and a third selection ink stoke 434. The ink word graphical objects are thus added to the previous selection. Further, the union select mode enables a user to tap a graphical object with the stylus 204 so that new elements or objects are added to a previous selection. In this manner, a user can add or extend a selection in the freeform environment for flexibility of operation.

In other aspects, the encounter select tool 500, 600, and 700 may store the order of sequential selection of the graphical objects. This feature may be applied to any operation for which an order relationship between the objects can be used for input. For example, the order of the objects selected can be used for an automatic numbering list of object. In another example, the order of the ink work objects selected by the encounter selection tool may be used in an ink-to-text conversion operation.

In another aspect, encounter select tool 500, 600, and 700 may select graphical objects in a three-dimensionally rendered work space. It will be appreciated that the display surface 202 can be modeled as a two-dimensional plane with X-Y coordinates and can be mapped for a z-coordinate variable to form a three-dimensional space. In this arrangement, display surface 202 is configured as pressure sensitive so that the movement of ink and selection ink can adjusted in the z-coordinate direction for depth. A light pressure stroke of the stylus 204 tip against the display surface 202 has less depth than a heavy pressure stroke. Nonetheless, encounter select tool 500, 600, 700 has the same functionally in the three-dimensional arrangement.

Summarization

As apparent from the foregoing description, the encounter select tool of the present invention provides a flexible and convenient tool for selecting graphical objects. As the user draws this freeform selection path, the encounter select tool selects graphical objects that are encountered by the path. In another aspect, the encounter select tool may change the visual appearance of any graphical object for visual user feedback once selected. Thus, the encounter select tool of the present invention provides a convenient selection tool for irregularly shaped objects, such as ink objects. Further, the tool conveniently allows for the selection of irregularly positioned objects, such as objects that are not always arranged in a straight line. In a further aspect, the encounter select tool provides the ability to select the ink having a particular property. In another aspect, the encounter select tool can recognize various selection gestures coordinated with a semantic relationship of the ink. In further aspects, the encounter select tool may change for different selection modes depending on the type of graphical object encountered and change of the context for a particular selection.

Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

The invention claimed is:

1. A system having a plurality of computer executable components for a computer processor, the system comprising:
   a user interface component for displaying a selection of at least one graphical object based upon a freeform selection path on a display surface, and
   a selection component for selecting the at least one graphical object encountered by the freeform selection path; wherein the at least one graphical object further includes a plurality of graphical objects formed of at least ink strokes, one or more of the objects having a first ink property and another one of the objects having a second ink property, and the selection component being configurable to select only the object associated with the first ink property during said encountering, regardless of said encountering of the objects having the second ink property.

2. The system in accordance with claim 1, in which the user interface component is configurable to change the graphical appearance of the at least one graphical object encountered by the freeform selection path, the graphical appearance being different from a graphical appearance of the freeform selection path.

3. The system in accordance with claim 2, in which the user interface component is configurable to surround the at least one graphical object with a graphical halo.

4. The system in accordance with claim 1, wherein the first ink property and the second ink property are selected from a group comprising a color value, a bold value, or a value indicative of a particular user associated with the ink strokes.

5. The system in accordance with claim 1, in which the freeform selection path comprises selection ink.

6. The system in accordance with claim 1, in which the freeform selection path has a first end and a second end, the user interface component being configurable to display a graphical handle at the first end and the second end of the freeform selection path.

7. The system in accordance with claim 5, in which the at least one graphical object comprises ink strokes created by an input device responsive with the display surface.

8. The system in accordance with claim 1, in which the system further includes a classifier component configured to classify said plurality of graphical objects into a semantic structure associated with the ink strokes for providing input to said selection component.

9. The system in accordance with claim 8, in which the plurality of graphical objects are selected responsive to the semantic structure.

10. The system in accordance with claim 9, in which the semantic structure is a word object.

11. The system in accordance with claim 9, in which the semantic structure is a paragraph object.

12. The system in accordance with claim 2, in which the freeform selection path further comprises selection ink and the at least one graphical object further comprises an ink stroke.

13. The system in accordance with claim 1, wherein the display includes a z-axis such that movement of selection ink associated with the z-axis is responsive to changes in pressure applied to the display surface.

14. The system in accordance with claim 1, in which the display surface is responsive to electromagnetic input.

15. The system in accordance with claim 1, in which the display surface is responsive to pressure input.

16. The system in accordance with claim 1, in which the least one graphical object comprises a first graphical object and a second graphical object, the first graphical object being formed in ink and the second graphical object including text, and the system further including a recognizer component configured to recognize the second graphical object so as to cause the user interface component to display a graphical cursor.

17. A computer system, comprising:
a processor;
a display; and
a memory for storing computer readable instructions that, when executed by said processor, cause the computer system to perform the steps of:
displaying a selection of a plurality graphical ink objects based upon a freeform selection path of selection ink drawn on the display,
displaying a graphical handle at each of a first end and a second end of the selection path of selection ink; wherein the graphical handle has a shape including a vertical portion connected to triangular portion and the vertical portion indicates a vertical bounds of the selection ink; and
selecting the plurality of graphical ink objects responsive to a detection by the selection ink.

18. The computer system in accordance with claim 17, in which the computer executable instructions causes the computer system to display a change in a graphical appearance of the plurality of graphical ink objects responsive to said detection, the graphical appearance being difference from a graphical appearance of the selection ink.

19. The computer system in accordance with claim 18, in which the computer executable instructions causes the computer system to display the plurality of graphical ink objects with a graphical halo for each graphical ink object.

20. The computer system in accordance with claim 17, in which the graphical ink objects further includes a first plurality of graphical ink objects having a first property and a second plurality of graphical ink objects having a second property, the first property and the second property being different, and in which the computer executable instructions causes the computer system to select only the graphical ink objects having the first property regardless of the graphical ink objects having the second property.

21. The computer system in accordance with claim 17, in which the computer executable instructions cause the computer system to classify said plurality of graphical objects into a semantic structure.

22. The computer system in accordance with claim 21, in which the semantic structure is a word ink object.

23. The computer system in accordance with claim 21, in which the semantic structure is a paragraph ink object.

24. The computer system in accordance with claim 17, in which the display is responsive to electromagnetic input from a stylus.

25. The computer system in accordance with claim 17, in which the display is responsive to pressure input from a stylus.

26. The computer system in accordance with claim 17, in which the computer executable instructions cause the computer system to recognize the graphical ink objects and a text word so as to display a graphical cursor for selecting said text word.

27. The computer system in accordance with claim 17, in which the computer executable instructions cause the computer system to perform a union select mode operable to select the plurality of graphical ink objects with a plurality of unconnected freeform selection paths.

28. A method of selecting an ink object graphically represented to a user, comprising the steps of:
receiving user input for displaying a selection the ink object based upon a freeform selection path on a display surface,
displaying opposing graphical handles responsive to receiving user input for indicating a first end and a second end of the selection path, the graphical handles indicating a vertical bounds of the selection path and at least one of the handles having a triangular section, and
selecting the ink object responsive to an encounter with the freeform selection path.

29. The method in accordance with claim 28, further including a step of displaying a change in a graphical appearance of the ink object responsive to said detection, the graphical appearance being difference from a graphical appearance of the selection path.

30. The method in accordance with claim 28, further including a step of displaying a graphical halo for the ink object.

31. The method in accordance with claim 28, further including a step of selecting the ink object only based on a color value of the ink object.

32. The method in accordance with claim 28, wherein the receiving step includes user input for a selection of machine generated text in the selection path, and further comprising displaying a graphical cursor for the text.

* * * * *